US012645175B2

(12) United States Patent
Ikegami et al.

(10) Patent No.: US 12,645,175 B2
(45) Date of Patent: Jun. 2, 2026

(54) FIXING UNIT AND IMAGE FORMING APPARATUS

(71) Applicant: CANON KABUSHIKI KAISHA, Tokyo (JP)

(72) Inventors: Shoichiro Ikegami, Kanagawa (JP); Kohei Okayasu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/019,691

(22) Filed: Jan. 14, 2025

(65) Prior Publication Data

US 2025/0244701 A1      Jul. 31, 2025

(30) Foreign Application Priority Data

Jan. 31, 2024    (JP) ................................. 2024-012744

(51) Int. Cl.
| | |
|---|---|
| *G03G 15/20* | (2006.01) |
| *C08J 5/18* | (2006.01) |
| *C08K 3/04* | (2006.01) |
| *C08K 7/08* | (2006.01) |

(52) U.S. Cl.
CPC ............ *G03G 15/2057* (2013.01); *C08J 5/18* (2013.01); *C08K 3/041* (2017.05); *C08K 7/08* (2013.01); *G03G 15/2064* (2013.01); *C08J 2379/08* (2013.01); *C08K 2201/011* (2013.01)

(58) Field of Classification Search
CPC ....................... G03G 15/2057; G03G 15/2064
USPC ........................................ 399/325, 328, 329
See application file for complete search history.

(56) References Cited

U.S. PATENT DOCUMENTS

| | | | |
|---|---|---|---|
| 8,811,872 | B2 | 8/2014 | Nakagawa et al. |
| 9,465,339 | B2 * | 10/2016 | Lee .................... G03G 15/2025 |
| 9,501,002 | B2 * | 11/2016 | Takano ................. B32B 27/288 |
| 10,281,858 | B2 | 5/2019 | Murata et al. |
| 10,423,107 | B2 | 9/2019 | Nakajima et al. |
| 10,545,440 | B2 | 1/2020 | Ikegami et al. |
| 10,908,539 | B2 * | 2/2021 | Taniguchi .......... G03G 15/2053 |
| 11,054,773 | B2 | 7/2021 | Furuichi et al. |

(Continued)

FOREIGN PATENT DOCUMENTS

| | | | |
|---|---|---|---|
| EP | 3783088 | A1 * | 2/2021 |
| JP | 2004-198655 | A | 7/2004 |

(Continued)

OTHER PUBLICATIONS

Notice of Reasons for Refusal in Japanese Application No. 2024-012744 (Nov. 2025).

*Primary Examiner* — Hoan H Tran
(74) *Attorney, Agent, or Firm* — Venable LLP

(57) ABSTRACT

A fixing unit includes a rotary member, a contact portion arranged in an internal space of the rotary member, a pressing member configured to be in contact with an outer surface of the rotary member, and a heating portion configured to heat the rotary member such that the rotary member heats an image on a recording material being nipped in and conveyed through a nip portion between the rotary member and the pressing member. A lubricant is applied between the inner surface of the rotary member and the contact portion. The lubricant contains a base oil at a ratio of 80% or more with respect to a total mass of the lubricant. A developed interfacial area ratio of the inner surface of the rotary member is 0.10 or more and 0.50 or less.

14 Claims, 4 Drawing Sheets

(56) References Cited

U.S. PATENT DOCUMENTS

| | | |
|---|---|---|
| 11,131,949 B2 | 9/2021 | Imaizumi |
| 11,237,504 B2 | 2/2022 | Ito et al. |
| 11,402,774 B2 | 8/2022 | Imaizumi |
| 11,414,620 B2 | 8/2022 | Oshima et al. |
| 11,635,713 B2 | 4/2023 | Imaizumi |
| 11,892,789 B2 | 2/2024 | Yamasaki et al. |
| 2023/0229099 A1 | 7/2023 | Imaizumi |

FOREIGN PATENT DOCUMENTS

| | | |
|---|---|---|
| JP | 2006-267408 A | 10/2006 |
| JP | 2008-76589 A | 4/2008 |
| JP | 2012-198516 A | 10/2012 |
| JP | 2013-64916 A | 4/2013 |
| JP | 2020-148943 A | 9/2020 |
| JP | 2021-36034 A | 3/2021 |
| JP | 2021-81690 A | 5/2021 |
| JP | 2021-196569 A | 12/2021 |
| JP | 2023-116278 A | 8/2023 |
| WO | 2016/013391 A1 | 1/2016 |

* cited by examiner

FIXING UNIT AND IMAGE FORMING APPARATUS

BACKGROUND OF THE INVENTION

Field of the Invention

The preset invention relates to a fixing unit for fixing images on recording materials, and an image forming apparatus for forming images on recording materials.

Description of the Related Art

Japanese Patent Application Laid-Open Publication No. 2008-076589 discloses a fixing unit including a tubular film, a heater that comes into contact with an inner surface of the film, a stay for supporting the heater, and a pressure roller that nips a film and forms a fixing nip together with the heater, wherein a lubricant is applied between the inner surface of the film and the heater surface. Further, Japanese Patent Application Laid-Open Publication No. 2008-076589 aims at preventing lubricant from laterally overflowing from an end portion of the film by providing a recessed portion that pools the lubricant at both longitudinal end portions of the stay.

The lubricant used in the fixing unit may contain a base oil and a thickening agent as main components, and friction is reduced by the base oil forming an oil layer, i.e., sliding layer, at an interface between objects that slide against each other. When the fixing unit is used for a long period of time, if the sliding layer is not maintained due to reasons such as extrusion or evaporation of the base oil, the sliding property is deteriorated, and image defects at the time of fixing or deformation and damaging of the film may occur.

If the amount of application of the lubricant is increased so as to maintain the sliding layer for a long period of time, thermal conduction may be prevented by the thickening agent, and fixing failures may occur, especially at an initial state immediately after assembling the fixing unit. Meanwhile, if a ratio of the base oil within the lubricant is increased, the viscosity of the lubricant is reduced, such that the base oil may tend to flow out of the area to be lubricated, and the sliding layer may not be maintained for a long period of time.

SUMMARY OF THE INVENTION

The present disclosure provides an image forming apparatus in which a good fixing property and a slidability stable for a long period can be realized.

According to an aspect of the disclosure, a fixing unit includes a rotary member formed in a tubular shape and configured to rotate, a contact portion arranged in an internal space of the rotary member and configured to be in sliding contact with an inner surface of the rotary member, a pressing member configured to be in contact with an outer surface of the rotary member and arranged to sandwich the rotary member together with the contact portion, and a heating portion configured to heat the rotary member such that the rotary member heats an image on a recording material being nipped in and conveyed through a nip portion between the rotary member and the pressing member and thus the image is fixed to the recording material, wherein a lubricant is applied between the inner surface of the rotary member and the contact portion, wherein the lubricant contains a base oil at a ratio of 80% or more with respect to a total mass of the lubricant, and wherein a developed interfacial area ratio of the inner surface of the rotary member is 0.10 or more and 0.50 or less.

Further features of the present invention will become apparent from the following description of exemplary embodiments with reference to the attached drawings.

DESCRIPTION OF THE EMBODIMENTS

Embodiments of the present disclosure will be described with reference to the drawings.

First Embodiment

A fixing unit 1 according to a first embodiment will be described. At first, the fixing unit 1, and an example of an image forming apparatus equipped with the fixing unit 1 will be described.

Figure 1A:
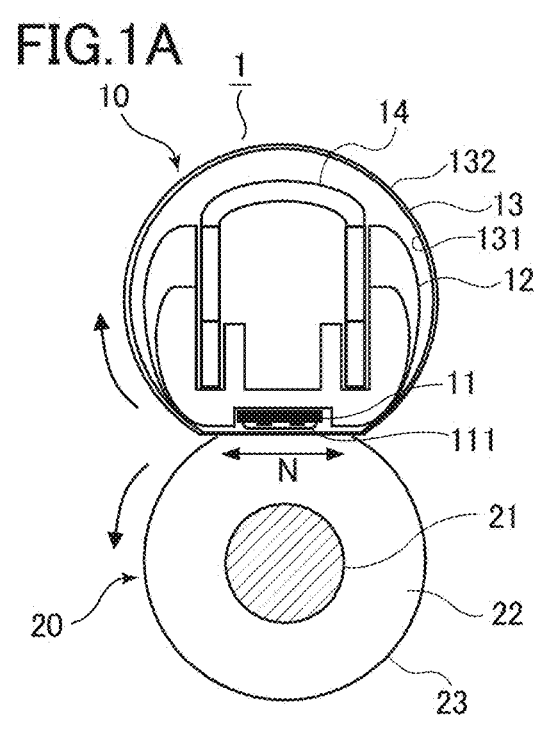
FIG. 1A is a cross-sectional view of a fixing unit according to first examples.
Figure 1B:
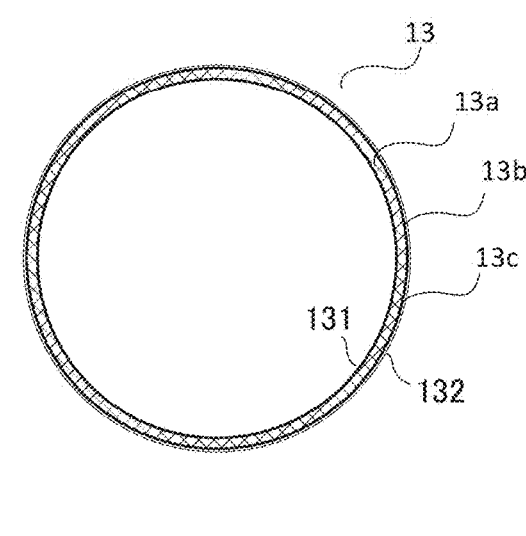
FIG. 1B is a schematic view of a fixing film.
Figure 1C:
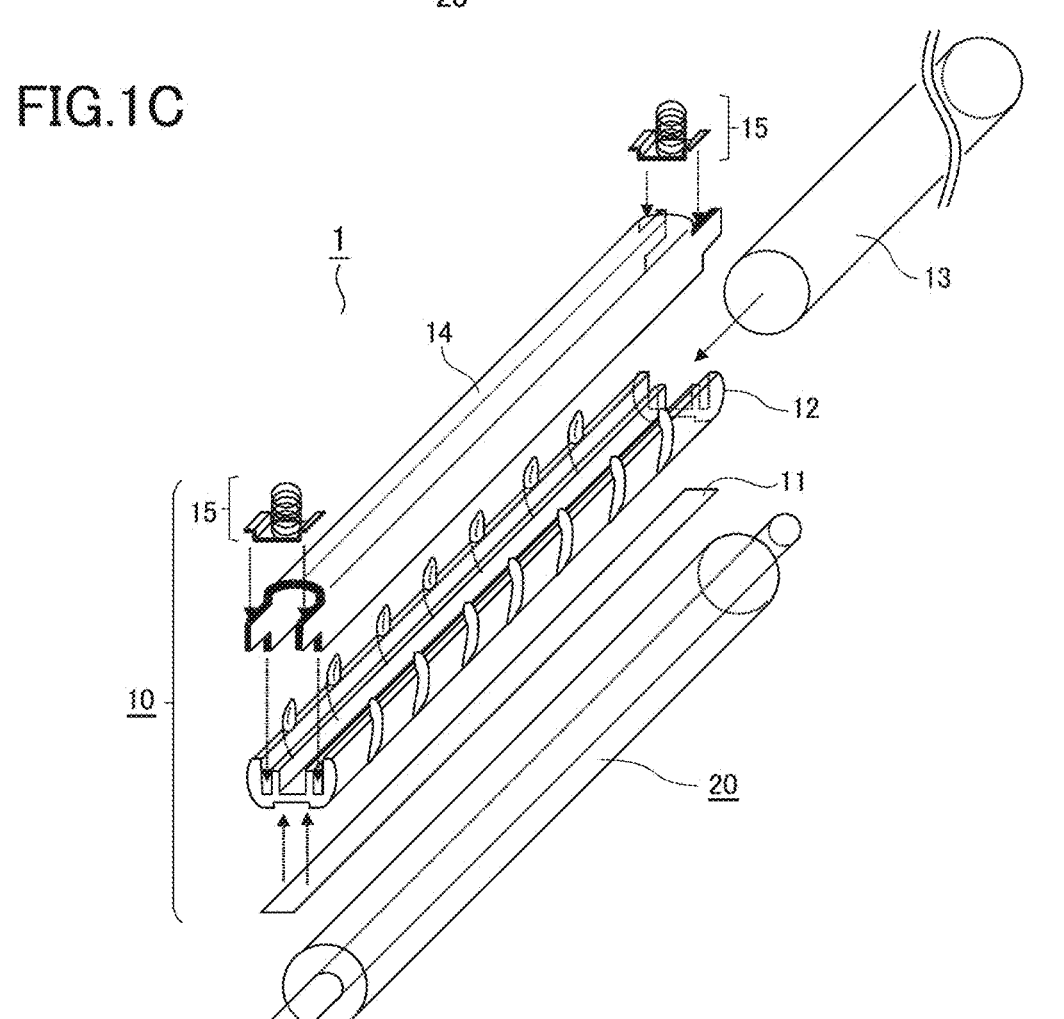
FIG. 1C is an exploded perspective view of the fixing unit.

FIG. 1A is a cross-sectional view of the fixing unit 1 according to the present embodiment. FIG. 1B is a schematic view illustrating a layer configuration of a fixing film 13 according to the present embodiment. FIG. 1C is an exploded perspective view of the fixing unit 1 according to the present embodiment.

The fixing unit 1 is a thermal fixing-type apparatus, i.e., image heating apparatus, that heats and fixing an image formed on the recording material using a developer, or toner, to a recording material in an image forming apparatus adopting an electrophotographic system or an electrostatic recording system.

As illustrated in FIGS. 1A and 1C, the fixing unit 1 is a film heating-type apparatus equipped with a film unit 10 including the fixing film 13, and a pressure roller 20. The film unit 10 includes a heater 11, a holding member 12, the fixing film 13, a metal stay 14, and pressurizing springs 15. As described later, a lubricant is applied between an inner surface 131 of the fixing film 13 and a contact surface 111 of the heater 11 that is in sliding contact with the inner surface 131 of the fixing film 13.

The fixing film 13 is an example of a rotary member formed in a tubular shape or hollow shape and configured to rotate. The heater 11 is an example of a heating portion that heats the fixing film 13. Further, the heater 11 according to the present embodiment is an example of a heating body that includes the contact surface 111, i.e., contact portion, that is in sliding contact with the inner surface 131 of the fixing film 13, that is arranged in an internal space of the fixing film 13, and that heats the fixing film 13. That is, the heater 11 according to the present embodiment is a unit in which a heating portion for heating the fixing film 13 and a contact portion arranged in the internal space of the fixing film 13 so as to come into contact with the inner surface of the fixing film 13 are integrated. The heating portion and the contact portion are not necessarily integrated, and the heating portion may be a separate unit from the contact portion.

The pressure roller 20 is an example of a pressing member that comes into contact with an outer surface 132 of the fixing film 13, and that is arranged to sandwich the fixing film 13 together with the heater 11, i.e., heating body. By having the pressure roller 20 and the contact surface 111, i.e., contact portion, of the heater 11 come into pressure contact with the fixing film 13 interposed therebetween, a fixing nip N, i.e., nip portion, is formed between the fixing film 13 and the pressure roller 20.

Fixing Film

The fixing film 13 is a heating member that is heated by the heater 11 and heats an image by coming into contact with the image on the recording material passing through the fixing nip N. The fixing film 13 according to the present embodiment is formed of a film member, i.e., thin film, having flexibility and heat-resisting property, and it may be formed of a resin film or a metal thin film. Alternatively, instead of the flexible fixing film 13, it may also be possible to adopt a rotary member having a hollow shape, or cylindrical shape, with higher stiffness. The fixing film 13 may be a composite material in which a plurality of material layers are laminated.

The fixing film 13 according to the present embodiment is composed of a base layer 13a, i.e., inner layer, that constitutes the inner surface 131, a conductive primer layer 13b disposed on the base layer 13a, and a release layer 13c formed on the conductive primer layer 13b (FIG. 1i). The base layer 13a is a resin film, and it may be formed of a polyimide resin having a thickness of 20 to 100 μm. The release layer 13c is formed of fluoropolymer, such as a tetrafluoroethylene-perfluoroalkylvinyl ether copolymer (PFA), a polytetrafluoroethylene (PTFE), or a tetrafluoroethylene-hexafluoropropylene copolymer (FEP).

According to the example of the present embodiment, the base layer 13a is formed of polyimide and has a thickness of 60 μm, the conductive primer layer 13b has a thickness of 3 μm, and the release layer 13c is formed by coating PFA having a conductive agent added thereto to a thickness of 10 μm. The total thickness of the fixing film 13 is approximately 73 μm, and a diameter thereof is 18 mm. Further, the thermal conduction of the base layer 13a is enhanced by mixing in a high thermal conducting filler. Further details of the fixing film 13 according to the present embodiment will be described below.

Heater

The heater 11 serving as a heating portion will be described. The heater 11 is a member having a function to supply heat to the fixing film 13 to heat the same. The contact portion coming in contact with the fixing film 13 may itself be a part of a heat generating unit, or may be disposed to transfer the heat received from another heat source to the fixing film 13.

Figures 2A, 2B:
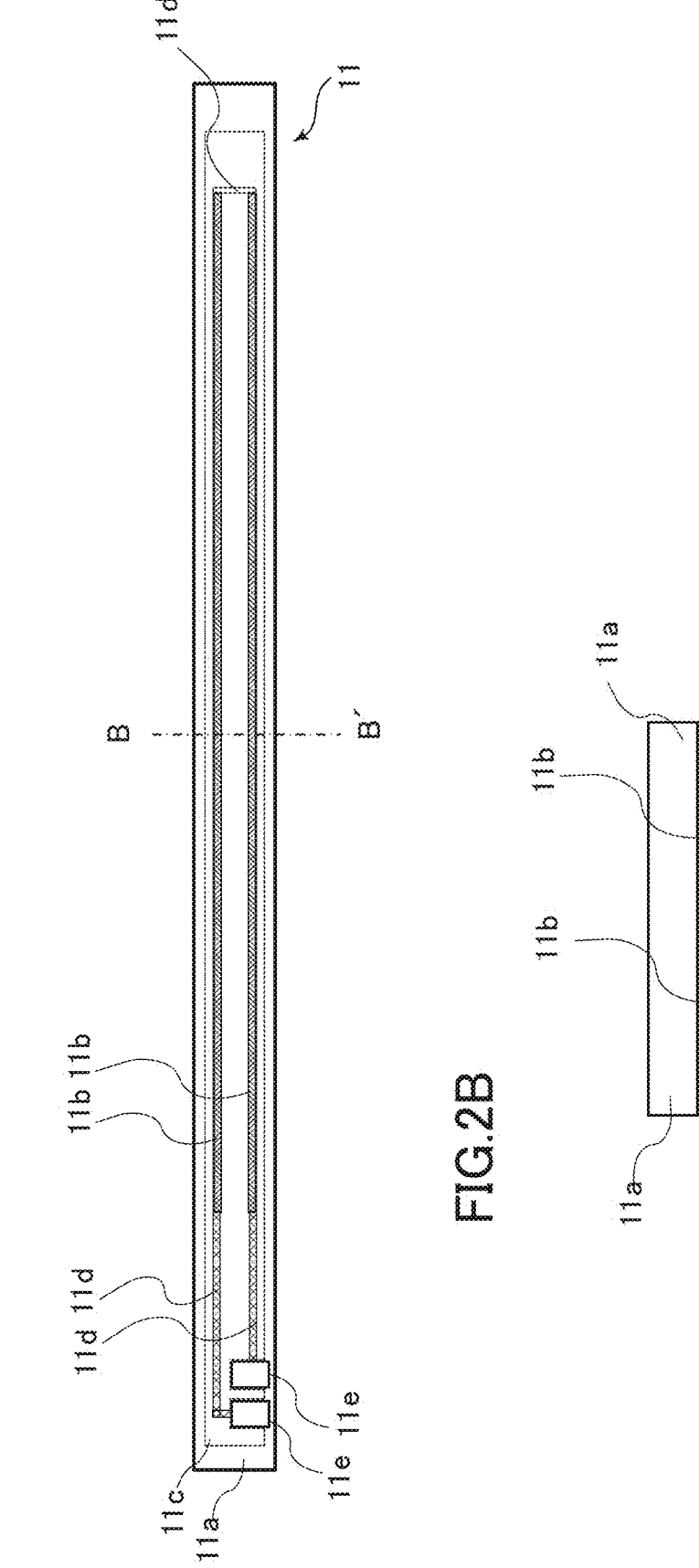
FIG. 2A is a schematic view of a heater according to the first examples.
FIG. 2B is a cross-sectional view of FIG. 2A

In the present embodiment, a configuration in which a surface of the heater 11 itself comes into contact with the inner surface of the fixing film 13 will be described. FIG. 2A is a schematic view illustrating a state in which the heater 11 is viewed from the side of the pressure roller 20, i.e., lower side in FIG. 1A. FIG. 2B is a cross-sectional view of the heater 11 taken at line B-B' of FIG. 2A.

The heater 11 includes a base plate 11a having a heat-resisting property and an insulating property, and heating resistors 11b that are formed on the base plate 11a and that generate heat when an electric current is passed. The base plate 11a is a member having a long, rectangular parallelepiped shape, or plate shape, with high thermal conductivity, such as an insulating base plate formed of alumina or aluminum nitride, or a base plate provided with an insulating property by having a glass coating applied on a metal plate. The heating resistors 11b are formed of an electric resistance material, such as silver-palladium (Ag/Pd), and it is formed with a thickness of approximately 10 μm on the surface of the base plate 11a using a method such as screen printing. The heating resistors 11b according to the present embodiment are formed of a pattern including two parts respectively extending in the longitudinal direction of the fixing nip N, i.e., direction orthogonal to the conveyance direction of the recording material.

Further, the heater 11 according to the present embodiment includes a protecting layer 11c, and two contacts 11e and a wiring 11d formed on the base plate 11a. The two contacts 11e are connected with a power supply terminal for supplying power to the heating resistors 11b. The wiring lid electrically connects the contacts 11e and the heating resistors 11b, and it is arranged from one of the contacts 11e via the heating resistors 11b to the other one of the contacts 11e so as to form a circuit. The protecting layer 11c is formed of a material having a heat-resisting property, such as glass or fluoropolymer, and it is disposed to cover the heating resistors 11b and the wiring 11d. In the present embodiment, the contact surface 111, i.e., contact portion, that is in sliding contact with the inner surface of the fixing film 13 is the surface of the protecting layer 11c. That is, the contact portion according to the present embodiment is apart of the heater 11 serving as a heating portion.

The example of the present embodiment uses the heater 11, in which an alumina base plate having a thickness of 1 mm is disposed as the base plate 11a, heating resistors 11b made of silver-palladium are formed on the base plate 11a, and a glass coating with a thickness of 60 μm is applied thereon as the protecting layer 11c.

Holding Member

The holding member 12 is a member, i.e., heater holder, that holds the heater 11. The holding member 12 is formed of a heat-resisting resin, such as a liquid crystal polymer, a phenol resin, a polyphenylene sulfide (PPS), or a polyether ether ketone (PEEK). When the thermal conductivity of the holding member 12 becomes lower, the thermal efficiency of the fixing unit 1 becomes higher, such that fillers with a low thermal conductivity, such as hollow glass particles and hollow silica particles, may be included the heat-resisting resin.

The holding member 12 receives urging force of pressurizing springs 15 through the metal stay 14, and urges the heater 11 toward the pressure roller 20. Thereby, a fixing nip N having a contact pressure and a nip width that is approximately uniform across the longitudinal direction is formed between the fixing film 13 that is externally fit to the heater 11 and the holding member 12, and the pressure roller 20. Further, the holding member 12 also functions to guide the rotation of the fixing film 13.

A groove hole, i.e., groove portion, for holding the heater 11 is formed on the holding member 12. The heater 11 is held on the holding member 12 in a state fit to the groove hole.

Pressure Roller

The pressure roller 20 includes, as illustrated in FIG. 1A, a core metal 21, an elastic layer 22 formed on an outer circumference of the core metal 21, and a release layer 23 formed on an outer circumference of the elastic layer 22. The core metal 21 is a shaft-shaped member made of metal such as stainless steel (SUS) or Al. The elastic layer 22 is an elastic solid rubber layer formed of a heat resistant rubber, such as a silicone rubber or a fluororubber. In order to further improve the heat insulating property, the elastic layer 22 may be an elastic sponge rubber layer formed by foaming silicone rubber, or an elastic foam rubber layer in which hollow fillers, such as micro-hollow particles, are dispersed in a silicon rubber layer such that gas portions are contained within a hardened material. The release layer 23 is formed of fluoropolymer, such as PFA and PTFE.

According to the example of the present embodiment, a silicon-hollow-ballon rubber layer with a thickness of 3.5 mm is formed as the elastic layer 22, and a PFA layer with a thickness of 30 μm is formed as the release layer 23. The diameter of the pressure roller 20 is 18 mm, and the surface hardness of the pressure roller 20 is 40 in Asker C hardness.

Metal Stay

The metal stay 14 has a function as a reinforcement member, i.e., stiffness member, that enhances the stiffness of the film unit 10. As illustrated in FIGS. 1A and 1C, the metal stay 14 is formed to have a rectangular shape with one side open in a cross section perpendicular to the longitudinal direction, and extends along the longitudinal direction.

Pressurizing Spring

The pressurizing springs 15 function as an urging member for generating pressurizing force in the fixing nip N. According to the present embodiment, the pressurizing springs 15 are arranged on both end portions of the film unit 10 in the longitudinal direction of the fixing nip N. Spring receiving portions each receiving the urging force of the pressurizing springs 15 are disposed on both end portions of the metal stay 14. The load applied by the pressurizing springs 15 is transmitted uniformly across the entire body of the holding member 12 in the longitudinal direction of the fixing nip N via the metal stay 14 having a high stiffness. At the fixing nip N, the fixing film 13 is nipped between the heater 11 and the pressure roller 20 by the urging force of the pressurizing springs 15 and is in close contact with the contact surface 111 of the heater 11.

Fixing Operation

The pressure roller 20 receives input of a rotary driving force in the direction of the arrow of FIG. 2A from a drive source, i.e., motor arranged on the main body of the image forming apparatus, via a drive gear not shown disposed at the end portion of the core metal 21. Along with the rotary drive of the pressure roller 20, the fixing film 13 rotates following the rotation of the pressure roller 20 by frictional force received from the pressure roller 20 at the fixing nip N.

A lubricant is applied between the fixing film 13 and the heater 11. A fluorine or silicone heat-resisting grease may be used as the lubricant. The lubricant is applied on either the contact surface 111 of the heater 11 or the inner surface 131 of the fixing film 13, or on both the contact surface 111 and the inner surface 131, when assembling the film unit 10. The lubricant may reduce the friction at the interface between the inner surface 131 of the fixing film 13 and the contact surface 111 of the heater 11, by which the fixing film 13 may be rotated smoothly.

Temperature control of the fixing unit 1 may be performed in the following manner. A temperature sensing element such as a thermistor is arranged on a rear surface, i.e., surface on the rear side of the contact surface 111, of the base plate 11a of the heater 11. A control portion on the image forming apparatus body controls a time ratio, i.e., power duty, for turning the power supply from a power supply circuit to the heater 11 on and off in response to the detection signal of the temperature sensing element. Thereby, the temperature within the fixing nip N is maintained to a predetermined target temperature suitable for fixing the image.

In a state where the recording material having an unfixed toner image formed thereon is conveyed to the fixing unit 1, the fixing unit 1 nips and conveys the recording material by the fixing nip N while heating the toner image on the recording material by the fixing film 13.

The fixing unit 1 according to the present embodiment may perform the fixing processing at a speed of 30 ppm to a Letter (LTR) size recording material by a processing speed of 170 mm/sec and a target temperature of 180° C. Further, a product life of the fixing unit 1 is set to an accumulated number of 50,000 printed sheets.

Image Forming Apparatus

Figure 4:
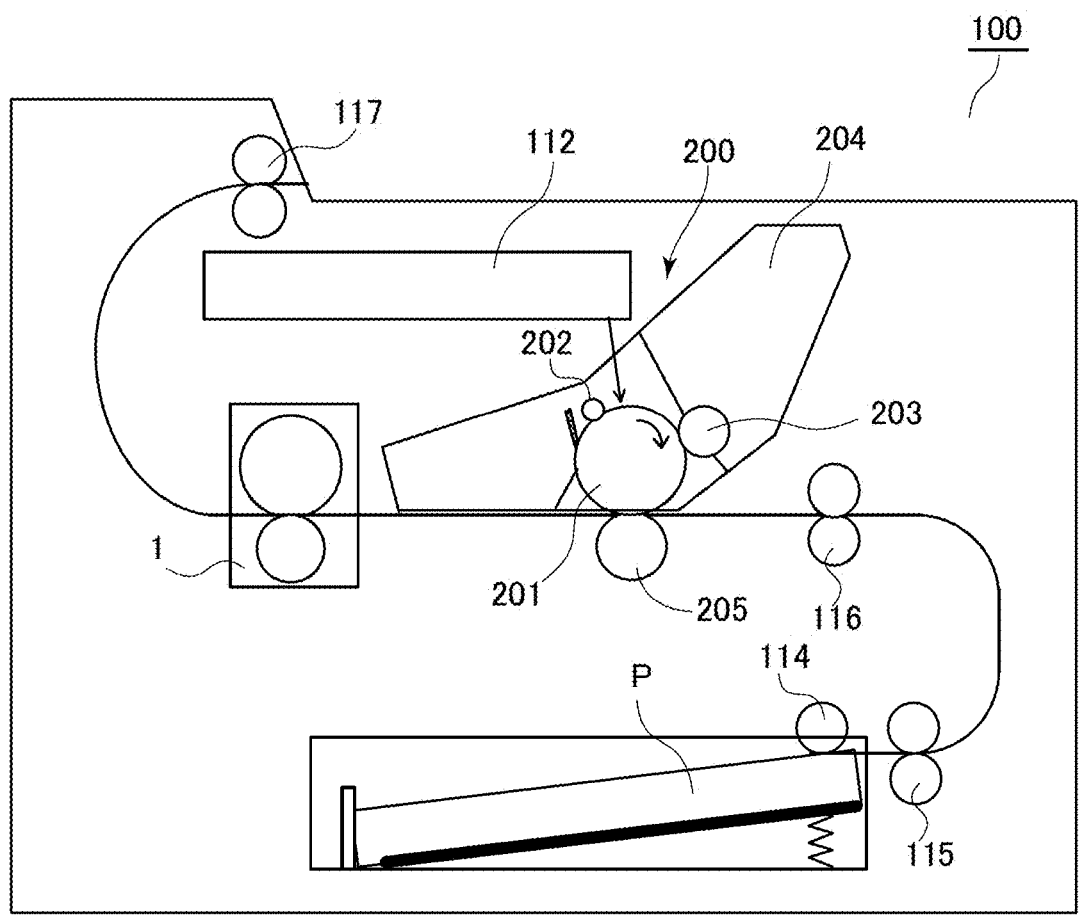
FIG. 4 is a schematic view of an image forming apparatus according to the first examples.

FIG. 4 is an example of an image forming apparatus 100 equipped with the fixing unit 1. The image forming apparatus 100 is capable of executing a series of operations, such as an image forming operation and a sheet feeding operation, for forming an image on a recording material P while conveying the recording material P one sheet at a time, based on an image information received from an exterior. Various types of sheet materials of different sizes and materials, including paper such as normal paper and thick paper, sheet materials subjected to surface treatments such as coated paper, special shaped sheet materials such as envelopes and index paper, plastic films, and cloths, may be used as the recording material P, i.e., recording medium. The image forming apparatus 100 may be any one of a single function printer, a copying machine having a copying function, and a multifunction machine having multiple functions.

The image forming apparatus 100 being illustrated is an electrophotographic monochromatic printer having a direct transfer type process unit 200 as the image forming portion. The process unit 200 includes a photosensitive drum 201 serving as an image bearing member, a charging roller 202 serving as a charging unit, a developing roller 203 serving as a developing portion, a toner storage portion 204 storing toner as a developer, and a transfer roller 205 serving as a transfer member. The transfer roller 205 and the photosensitive drum 201 constitute a transfer nip serving as a transfer portion performing image formation, i.e., transfer of toner image, to the recording material P. The process unit 200 may be a cartridge that may be detachably attached to the main body of the image forming apparatus 100.

Further, the image forming apparatus 100 includes an exposing unit 112, the fixing unit 1, and a plurality of rollers 114, 115, 116, and 117 for conveying the recording material P.

In a state where the control portion of the image forming apparatus 100 receives an image information, the image forming operation is started. The photosensitive drum 201 is driven to rotate at a predetermined peripheral speed, i.e., processing speed, to the direction of the arrow in the drawing. The charging roller 202 charges the surface of the photosensitive drum 201 uniformly. The exposing unit 112 irradiates the photosensitive drum 201 with light based on the image information and performs an exposing process of forming an electrostatic latent image on a surface of the photosensitive drum 201. The developing roller 203 bears toner stored in the toner storage portion 204 and supplies the same to the photosensitive drum 201, and develops the electrostatic latent image into a toner image. The toner image being developed is borne on the photosensitive drum 201 and is transferred to the transfer nip by the rotation of the photosensitive drum 201.

In parallel with the creation of the toner image, the recording material P is fed by a feed roller 114 from a storage portion disposed on a lower portion of the image forming apparatus 100. A separation roller pair 115 conveys the recording material P while separating the recording material P sheet by sheet. A registration roller pair 116 conveys the recording material P having been conveyed to the transfer nip at a matched timing with the reaching of the toner image on the photosensitive drum 201 to the transfer nip. Then, by having a transfer voltage applied to the transfer roller 205 at the transfer nip, the toner image is transferred to the recording material P from the photosensitive drum 201.

The recording material P having passed through the transfer nip is conveyed to the fixing unit 1, where the recording material P receives heat fixing processing of toner image at the fixing nip N. The recording material P having passed through the fixing unit 1 is discharged to an exterior of the image forming apparatus 100 by a discharge roller pair 117.

The image forming apparatus 100 described above is an example of an image forming apparatus capable of having the fixing unit 1 loaded thereon, and the fixing unit 1 may be loaded in an image forming apparatus having other configurations. For example, the image forming apparatus may be a color printer having a plurality of process units 200 and that may form color images using colored toners. Further, the process unit 200 is not limited to a direct transfer system in which toner image is transferred directly from the photosensitive drum 201 to the recording material P, and it may be an intermediate transfer system in which toner image is transferred from the photosensitive drum 201 to the recording material P via an intermediate transfer body such as an intermediate transfer belt.

Lubricant Retaining Function of Fixing Film

Figure 3A:
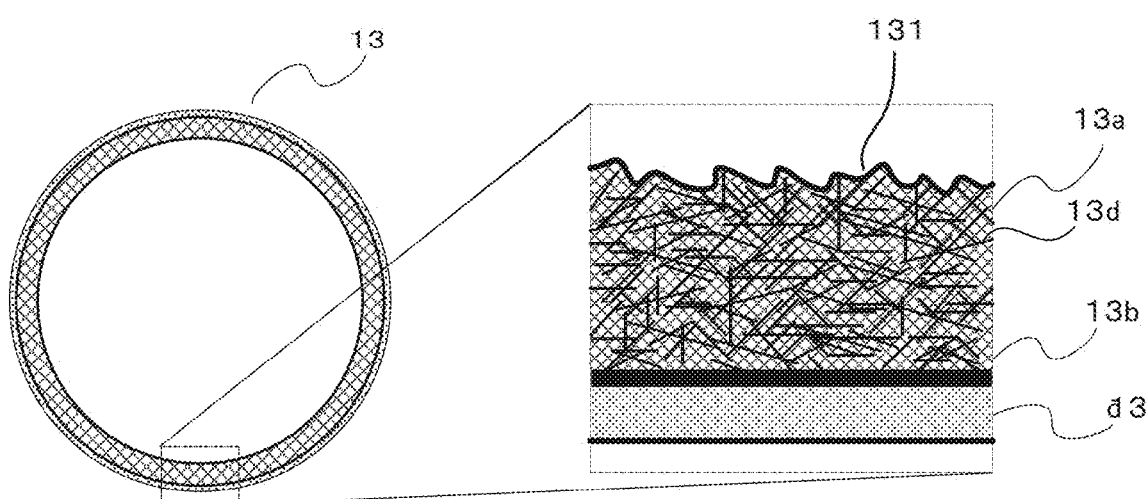
FIGS. 3A and 3B are each an explanatory view of the fixing film according to the first examples.

The fixing film 13 and the lubricant according to the present embodiment will be described. FIG. 3A is a cross-sectional view in which the fixing film 13 according to the present embodiment is cut at a cross section perpendicular to the longitudinal direction of the fixing nip N, and a partially enlarged view in which a portion thereof is enlarged.

As illustrated in FIG. 3A, a minute roughness is formed on the inner surface 131 of the fixing film 13. The fixing film 13 according to the present embodiment may realize a stable slidability for a long period of time by retaining the base oil of the lubricant in the spaces between the minute roughness of the inner surface 131.

According to the example of the present embodiment, a filler is dispersed within the resin material forming the base layer 13a of the fixing film 13, by which the level of roughness of the inner surface 131 is controlled. A needle shaped filler 13d is used as the filler. A network structure in which the needle shaped filler 13d is arranged in a complex manner is formed within the base layer 13a.

In the example of the present embodiment, the base layer 13a is formed of polyimide resin. Either a thermosetting polyimide resin or a thermoplastic polyimide resin may be used as the base layer 13a, and in the present example, the thermosetting polyimide resin is used. A polyimide precursor having the needle shaped filler 13d added thereto in a dispersed manner is referred to as a polyimide varnish. The base layer 13a may be formed by depositing a layer of polyimide resin on an outer surface of a cylindrical core body, then drying and heating the same to cure the resin. The method for deposition may be a dipping method in which a polyimide varnish is filled in a container, and the cylindrical core body is inserted to and drawn out of the polyimide varnish container, or a ring coating method in which the polyimide varnish is helically coated on the outer surface of the cylindrical core body using a dispenser, or any other known methods.

The level of roughness of the inner surface 131 of the fixing film 13 may be expressed in numerical form using a developed interfacial area ratio Sdr as an indicator. The developed interfacial area ratio Sdr is defined in the standards ISO 25178 established by the International Organization for Standardization. The developed interfacial area ratio Sdr indicates a ratio of increase of an expanded area, i.e., surface area, of the defined area from an apparent area of the defined area. The developed interfacial area ratio Sdr may be acquired by measuring a surface shape through a laser microscope, such as VK-9500 (product name) manufactured by Keyence Corp., using an objective lens having a magnifying power of 150 times.

In the present embodiment, a lubricant that does not contain a thickening agent and that is formed approximately only of base oil is used. As the base oil, a fluorine oil such as perfluoropolyether (PFPE) or a silicone oil may be used. The PFPE is a polymer in which a perfluoroalkylene ether is contained as the recurring unit. Actual examples of the perfluoroalkylene ether include perfluoromethyl ether, perfluoroethyl ether, perfluoro propyl ether, and perfluoro isopropyl ether.

The expression "formed approximately only of base oil" means that a main component other than base oil is not contained, and it may contain a minute amount of additive, such as 10% or less, preferably 5% or less, or more preferably 1% or less additive with respect to the entire mass of the lubricant. The additive is a component other than the base oil and the thickening agent that is added to improve the performance of the lubricant according to the purpose of use of the lubricant, such as an antioxidant, an antifoaming agent, or an antiwear additive. According to the examples of the present embodiment, i.e., Examples 1-1 to 1-4 described later, a lubricant only containing a base oil component and not containing any thickening agent or additive, that is, a lubricant in which a mixture ratio of base oil is 100%, is used.

According to the present embodiment, the lubricant not containing any thickening agent is used, such that the thermal conduction from the heater 11, i.e., heating portion or heating body, to the fixing film 13 will not be obstructed by the thickening agent. Therefore, a good fixing property may be obtained even if the amount of application of lubricant is increased.

Figure 3B:
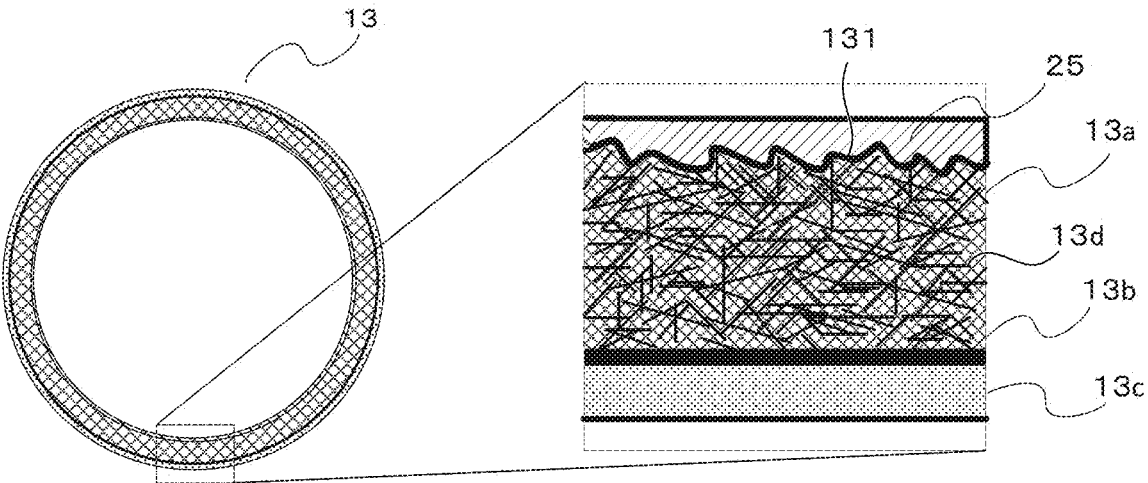

In a state where a base oil contacts the minute roughness on the inner surface 131 of the fixing film 13, as illustrated in FIG. 3B, the base oil is immersed into and retained by the recessed portion due to a capillary effect. Thereby, a state in which a sliding layer 25, which is a layer of base oil, is formed between the inner surface 131 of the fixing film 13 and the contact surface 111 of the heater 11 may be maintained for a long period of time.

The retaining action of base oil by the fixing film 13 may be achieved by forming a roughness on the inner surface 131 of the fixing film 13 such that the developed interfacial area ratio Sdr falls within an appropriate range. Thereby, even if the lubricant is composed only of a base oil and does not contain a thickening agent, the sliding layer 25 is formed on the entirety of the inner surface 131 of the fixing film 13 and retained thereon. Therefore, a stable slidability may be achieved for a long period of time, and the running stability of the fixing film 13 may be enhanced.

The lubricant containing a thickening agent may have the thickening agent separate from the base oil at a high temperature. The lubricant has viscosity, whereas the base oil is a fluid with low viscosity. Therefore, the base oil may be dispersed through the gap between members by capillary action, or the base oil may be extruded to the outer side of the fixing nip N due to pressure change accompanying the fixing operation. Further, the base oil is gradually evaporated by the heating performed during the fixing operation. Due to such causes, the amount of base oil within the lubricant is gradually reduced when used for a long period of time. When the sliding layer could not be maintained due to the reduction of base oil, the slidability between the fixing film 13 and the heater 11 is deteriorated, and the running stability of the fixing film 13 is lost, such that as a result, conveyance failure of recording materials or image defects during fixing operations may occur.

According to the present embodiment, by using a lubricant composed only of base oil, and using the fixing film 13 whose developed interfacial area ratio Sdr is within a predetermined range, a good fixing property and a slidability that is stable for a long period of time may be realized.

embodiment, the amount of addition of the needle shaped filler 13d is set to 20 vol. % in Example 1-1, 30 vol. % in Example 1-2, 40 vol. % in Example 1-3, and 45 vol. % in Example 1-4. The unit, i.e., vol. %, described above refers to a ratio that a total volume of the needle shaped filler 13d dispersed within the base layer 13a occupies with respect to an overall volume of the base layer 13a.

In the first examples, a PFPE lubricant, Fomblin M30, which is a product of Solvay S.A., that does not have a thickening agent added thereto was used as the lubricant. 60 mg of PFPE lubricant was spray-coated onto the inner surface 131 of the fixing film 13.

Comparative Examples 1 to 3 having amounts of addition or types of the filler that differ from the first examples have been prepared as comparative examples. In comparative example 1, the needle shaped filler 13d was not added to the base layer 13a, and instead, 30 vol. % of plate shaped filler was added thereto. In comparative example 2, 10 vol. % of the needle shaped filler 13d was added to the base layer 13a. In comparative example 3, 50 vol. % of the needle shaped filler 13d was added to the base layer 13a. Comparative example 4 will be described in detail later.

TABLE 1

| | COMP. EX. 1 | COMP. EX. 2 | EXAMPLE 1-1 | EXAMPLE 1-2 | EXAMPLE 1-3 | EXAMPLE 1-4 | COMP. EX. 3 | COMP. EX. 4 |
|---|---|---|---|---|---|---|---|---|
| NEEDLE SHAPED FILLER [VOL. %] | 0 | 10 | 20 | 30 | 40 | 45 | 50 | 0 |
| PLATE SHAPED FILLER [VOL. %] | 30 | 0 | 0 | 0 | 0 | 0 | 0 | 30 |
| ROUGHNESS FORMED BY MOLD ETCHING | NONE | NONE | NONE | NONE | NONE | NONE | NONE | OCCURRED |
| DEVELOPED INTERFACIAL AREA RATIO Sdr (INITIAL) | 0.072 | 0.041 | 0.102 | 0.258 | 0.421 | 0.503 | 0.705 | 0.253 |
| WEIGHT INCREASE AFTER CLEANING [mg] | 0 | 0 | 5 | 10 | 12 | 14 | 17 | 8 |
| PRINTED NUMBER OF SHEETS WHEN IMAGE DEFECT OCCURRED [K SHEETS] | 41 | 43 | 79 | 88 | 89 | 78 | 45 | 44 |
| DEFORMATION/DAMAGING | NONE | NONE | NONE | NONE | NONE | OCCURRED | OCCURRED | NONE |
| DEVELOPED INTERFACIAL AREA RATIO Sdr (AFTER DURABILITY TEST) | 0.065 | 0.040 | 0.108 | 0.252 | 0.432 | 0.525 | 0.722 | 0.061 |

Details of Fixing Film

Details of the fixing film 13 according to first examples, i.e., Examples 1-1 to 1-4, of the present embodiment will be described with reference to FIGS. 3A and 3B. The base layer 13a of the fixing film 13 is a polyimide resin composition in which the needle shaped filler 13d is added to the polyimide resin serving as a base material. Needle-shaped carbon nanotubes, needle-shaped titanium oxide, or a mixture thereof may be used as the needle shaped filler 13d. In the first examples, needle-shaped carbon nanotubes were adopted. It is preferable to use carbon nanotubes with a diameter of 3 μm or smaller and a length of 50 μm or smaller. In the first examples, VGCF-H (VGCF being a Registered Trademark) of Resonac Holdings Corporation was used. A filler having shapes other than the needle shape may be adopted, as long as a minute roughness may be formed on the inner surface 131 of the fixing film 13 such that the developed interfacial area ratio Sdr described later falls within an appropriate range.

The amount of addition of the needle shaped filler 13d may be adjusted in order to realize a minute roughness on the inner surface 131 of the fixing film 13. In the present The "developed interfacial area ratio Sdr (initial state)" of Table 1 indicates measurement results of the developed interfacial area ratio Sdr according to the respective examples. There is a tendency that when the amount of addition of the needle shaped filler is increased, the value of the developed interfacial area ratio Sdr increases, that is, the surface area of the inner surface 131 of the fixing film 13 increases. The magnitude of the developed interfacial area ratio Sdr also depends on the shape of the filler, and in a state where a plate shaped filler is added, it can be recognized that the developed interfacial area ratio Sdr is lowered compared to a case where the needle shaped filler is added.

Further, the relationship between the developed interfacial area ratio Sdr and a retaining power of lubricant was examined. The numerical value on row "weight increase after cleaning" of Table 1 indicates a difference between measurement of a weight of the fixing film 13 measured in a new state according to each example and measurement of a weight after cleaning measured by thoroughly wiping off the lubricant after the lubricant had been spray-coated. That is, the larger the weight increase after cleaning, the greater the retaining power of lubricant by the fixing film 13. The cleaning by wiping was performed by wiping using a cleaning tool having Kimwipes S-200 (product name), which is a product of Nippon Paper Crecia Co., Ltd., attached to a cleaning rod. After wiping one fixing film for 10 times back and forth, the Kimwipes S-200 was replaced, and such wiping operation was repeated for 10 times.

In order to compare the influence of surface shapes, a comparative example 4 was prepared, wherein the fixing film 13 was formed with the same material as comparative example 1, and roughness was formed thereafter to the inner surface 131 of the fixing film 13. The comparative example 4 was formed to have a minute roughness by etching a surface of a mold, and transferring the surface shape of the mold to the inner surface 131 of the fixing film 13. The state of the roughness was adjusted to be equivalent as Example 1-2.

According to the "developed interfacial area ratio Sdr (initial state)" and "weight increase after cleaning" of Table 1, it can be recognized that the higher the developed interfacial area ratio Sdr, the greater the weight of lubricant retained in the fixing film 13 after performing cleaning by wiping. That is, the retaining power of lubricant by the fixing film 13 was higher when the developed interfacial area ratio Sdr was higher. This is considered to be realized by the capillary effect causing lubricant to enter the minute spaces formed by the roughness on the inner surface 131 of the fixing film 13, and the lubricant being retained in the space even after performing cleaning by wiping.

Further, a durability test was performed using Examples 1-1 to 1-4 and comparative Examples 1 to 4. The "printed number of sheets when image defect occurred" and "printed number of sheets when deformation occurred" in Table 1 show results of the durability test. The durability test evaluated the running stability of the fixing film 13 while repeatedly performing printing by the image forming apparatus 100 in which the fixing films 13 of the respective examples were attached to the fixing unit 1. The running stability of the fixing film 13 was evaluated based on the presence of image defects and the presence of deformation or damage of the fixing film 13. When the sliding layer of lubricant is lost during the durability test, frictional force is increased, causing sliding to occur between the fixing film 13 and the recording material P or between the fixing film 13 and the image on the recording material P, by which image defects may occur. Further, by having load applied on the fixing film 13 during printing, the fixing film 13 may be damaged or deformed. Printing of sheets was continuously performed until image defects or deformation/damaging occurred, and the number of printed sheets at that time were recorded. The unit "K sheets" means 1000 sheets, and for example, "41" of comparative example 1 indicates that image defects occurred when approximately 41,000 sheets of recording materials P had been printed.

Based on the "printed number of sheets when image defect occurred" and "printed number of sheets when deformation occurred" of Table 1, it can be recognized that the durability of the fixing film 13 was improved significantly according to Examples 1-1 to 1-4 compared to Comparative Examples 1 to 4. Based on these results, it is considered that if the developed interfacial area ratio Sdr is 0.1 or greater, that is, 0.10 or greater by rounding off the third decimal place, the fixing film 13 will have sufficient lubricant and the sliding layer may be maintained for a long period of time.

According to Example 1-4 and Comparative Example 3, deformation or damaging of the fixing film 13 had occurred before image defects, such that the durability test was interrupted, and the printed number of sheets at that point of time was recorded. Generally, if a large amount of high thermal conducting filler is added to a polyimide tube, material property tends to be embrittled. From the viewpoint of mechanical strength of the fixing film 13, there is an upper limit in the amount of addition of high thermal conducting filler, and as a result of the tests, it may be preferable that the amount is at most approximately 45 vol. %. That is, the amount of filler to be added to the polyimide resin is preferably 20 vol. % or more and 45 vol. % or less.

Further, since the developed interfacial area ratio Sdr was 0.503 (Example 1-4) when the amount of addition of the needle shaped filler 13d was 45 vol. %, it may be recognized that the developed interfacial area ratio Sdr is preferably 0.5 or smaller, that is, 0.50 or smaller by rounding off the third decimal place.

According to Examples 1-3 and 1-4, the durability was further enhanced than Examples 1-1 and 1-4. Therefore, from the viewpoint of durability, it is even more preferable that the developed interfacial area ratio Sdr is 0.26 or more and 0.42 or less, up to the second decimal place.

Next, studies were performed to check whether the roughness of the inner surface 131 of the fixing film 13 was worn down after a long period of use. The inner surface 131 of the fixing film 13 after performing the durability test was observed, and the developed interfacial area ratio Sdr was computed again. The "developed interfacial area ratio Sdr (after durability test)" of Table 1 shows the values of developed interfacial area ratio Sdr after the durability test that had been computed for each examples.

As shown in the "developed interfacial area ratio Sdr (after durability test)" of Table 1, according to Comparative Example 4, it can be recognized that the developed interfacial area ratio Sdr after the durability test was significantly reduced compared to the initial state. That is, Comparative Example 4 applies a minute roughness to the inner surface 131 of the fixing film 13 by transferring the roughness of the mold thereto, but it is considered that this roughness was worn down by the abrasion caused by printing of sheets. During printing of sheets, pressure, heat, and shearing force are applied to the inner surface 131 of the fixing film 13, such that the inner surface 131 is smoothed by external force applied during printing of sheets, and the minute roughness could not be maintained.

In contrast, according to Examples 1-1 to 1-4 and Comparative Examples 2 and 3, the minute roughness on the inner surface 131 is formed by the needle shaped filler 13d added to the base layer 13a. In the inner surface 131, a sea-island structure of the needle shaped filler portion and the polyimide resin portion is formed in a three-dimensional manner. Thereby, it may be considered that even if the uppermost layer of the inner surface 131 is damaged by the external force received during printing of sheets, the minute roughness structure, i.e., the sea-island structure, may be maintained, and the lubricant retaining power was maintained high for a longer period of time than Comparative Example 4.

If the abrasion of the base layer 13a is small, it may be possible to adopt a method of forming a minute roughness to the inner surface 131 of the fixing film 13 as Comparative Example 4 without adding fillers.

According to the Examples 1-1 to 1-4 and Comparative Examples 1 to 4 described above, Fomblin M30 that does not contain any thickening agent was used as the lubricant. In order to examine the influence of the thickening agent, Comparative Examples using lubricant that contains thickening agents were prepared.

According to Comparative Examples 5 and 6, a MOLYKOTE (Registered Trademark) HP-300, which is manufactured by Dow Corning Toray, was used as the lubricant containing a thickening agent. In Comparative Example 5, 250 mg of MOLYKOTE HP-300 was applied on the heater 11, and in Comparative Example 6, 60 mg of MOLYKOTE HP-300 was applied on the heater 11. Configurations other than the lubricant of the fixing unit 1 are the same as Examples 1-1 to 1-4.

As described above, the thickening agent may serve as an obstruction that obstructs thermal conduction from the heater 11, i.e., heating portion or heating body, to the fixing film 13. Therefore, if a lubricant that contains a thickening agent is used in the fixing unit 1, since the lubricant is not adapted in the initial state immediately after assembling the fixing unit 1, the amount of heat that the thickening agent applies on the recording material P may be dispersed, and fixing failures may occur. For example, if a black image is printed on the entire surface in the initial state, the unevenness in the amount of heat caused by the lubricant may cause a part of the image to be peeled, or the output image may be peeled off when rubbed by hand. In order to prevent such fixing failures, measures may be taken to set the target temperature of the temperature control of the fixing unit 1 higher by 10° C. than the normal temperature in the initial state.

In contrast, according to the present embodiment, a base oil that does not contain a thickening agent is used as the lubricant, such that it is expected that the fixing failures during the initial state caused by the thickening agent may be improved. Therefore, a comparative experiment that evaluates the fixing property, i.e., initial fixing property, in the initial state of the Comparative Examples 5 and 6 and the Examples 1-1 to 1-4 was performed. The fixing unit 1 of the initial state was used, and the target temperature was set to the same value in all the examples. A black image was formed on the entire surface of an A4-size sheet having a grammage of 80 g, that is, Canon Red Label Superior FSC 80 g/m$^2$ A4 paper, using the image forming apparatus 100 equipped with the fixing film 13 according to each example, and whether image peeling has occurred was evaluated. The results are shown in Table 2.

or less, up to the second decimal place. Thereby, lubricant may be retained by capillary action in the spaces formed on the minute roughness, and the sliding layer may be maintained for a long period of time, such that a stable slidability may be obtained for a long period of time. Further, by using a base oil that does not contain a thickening agent, a good fixing property may be achieved even in an initial state immediately after assembly.

As described, according to the present embodiment, a fixing unit capable of realizing a good initial fixing property and a stable slidability for a long period of time, and an image forming apparatus equipped with the same may be provided.

Second Embodiment

As a second embodiment, a configuration in which a small amount of thickening agent is contained in the lubricant is described. In the following description, elements denoted with the same reference numbers as the first embodiment are considered to have basically the same configurations and effects as those described in the first embodiment, unless denoted otherwise, such that portions that differ from the first embodiment are mainly described.

A ratio of base oil contained in the lubricant is referred to as a base oil rate, i.e., oil content rate. The base oil rate is a mixture ratio of the mass of base oil to the total mass of the lubricant. The unit (%) of the base oil rate is mass percent.

In order to determine an appropriate base oil rate, the durability and the initial fixing property are evaluated by setting the base oil rate to four levels, which are 70%, 80%, 90%, and 100%, for Examples 2-1 to 2-3 and Comparative Example 7, each of which have different developed interfacial area ratios Sdr. The fixing film 13 of Example 2-1 is the same as Example 1-1, the fixing film 13 of Example 2-2 is the same as Example 1-2, and the fixing film 13 of Example 2-3 is the same as Example 1-4. 75 mg of lubricant was spray-coated on the surface of the heater 11.

In the durability test, if the fixing unit endured printing of 75,000 sheets, which is 1.5 times the number of sheets of the product life thereof, the durability was evaluated as good (G), and if the printing could not be continued until the

TABLE 2

|  | COMP. EX. 5 | COMP. EX. 6 | EXAMPLE 1-1 | EXAMPLE 1-2 | EXAMPLE 1-3 | EXAMPLE 1-4 |
|---|---|---|---|---|---|---|
| FOMBLIN M30 [mg] | 0 | 0 | 60 | 60 | 60 | 60 |
| MOLYKOTE HP-300 [mg] | 250 | 60 | 0 | 0 | 0 | 0 |
| INITIAL FIXING PROPERTY | Poor | Poor | Good | Good | Good | Good |

As shown in Table 2, in all Examples 1-1 to 1-4, the initial fixing property was good. Meanwhile, according to Comparative Example 5, image peeling had occurred, such that the initial fixing property was poor. According to Comparative Example 6, the amount of application of was is smaller than Comparative Example 5, but the initial fixing property was poor.

As described above, according to the present embodiment, a minute roughness is provided on the inner surface 131 of the fixing film 13, and a base oil that does not contain a thickening agent is used as the lubricant. The minute roughness is set to have a developed interfacial area ratio Sdr of 0.1 or more and 0.5 or less, that is, 0.10 or more and 0.50 printing of 75,000 sheets was completed, for example, due to a rotation failure of the fixing film 13, the durability was evaluated as poor (P). As for the initial fixing property, the fixing unit 1 in the initial state was used, and the target temperature was the same in each of the conditions. A black image was printed to the entire surface, and the presence of fixing failures such as image peeling was evaluated. The results are shown in Table 3. If there were no fixing failures, the initial fixing property was evaluated as good (G), and if there were fixing failures, the initial fixing property was evaluated as poor (P).

TABLE 3

| | COMP. EX. 7 | | | | EXAMPLE 2-1 | | | | EXAMPLE 2-2 | | | | EXAMPLE 2-3 | | | |
|---|---|---|---|---|---|---|---|---|---|---|---|---|---|---|---|---|
| DEVELOPED INTERFACIAL AREA RATIO Sdr | 0.047 | | | | 0.102 | | | | 0.258 | | | | 0.503 | | | |
| BASE OIL RATE[%] | 70 | 80 | 90 | 100 | 70 | 80 | 90 | 100 | 70 | 80 | 90 | 100 | 70 | 80 | 90 | 100 |
| DURABILITY | G | G | P | P | G | G | G | G | G | G | G | G | G | G | G | G |
| INITIAL FIXING PROPERTY | P | P | G | G | P | G | G | G | P | G | G | G | P | G | G | G |

As illustrated in Table 3, the durability was good for all the Examples 2-1 to 2-3. The target was achieved, and the results were good. Meanwhile, as for Comparative Example 7, according to conditions where the base oil rate was 70% and 80%, the durability was good, but according to conditions where the base oil rate was 90% and 100%, the durability was poor. In Comparative Example 7, the inner surface 131 of the fixing film 13 is smooth, such that if the base oil rate of the lubricant is high, the lubricant tends to leak out from the end portions of the fixing film 13 due to the low viscosity of the lubricant. As a result, along with the increase in the printed number of sheets, the base oil was reduced, and the sliding layer could not be maintained, causing rotation failure of the fixing film 13.

Regarding the initial fixing property, in Examples 2-1 to 2-3, fixing failures were seen in the condition where the base oil rate was 70%, but in conditions where the base oil rate was 80% or higher, that is, where the mixing ratio of the thickening agent was 20% or less, fixing failures were not recognized. Meanwhile, in Comparative Example 7, fixing failures were recognized in conditions where the base oil rates were 70% and 80%, and fixing failures were not recognized in conditions where the base oil rates were 90% and 100%.

In any case, it was confirmed that less fixing failures occurred in the initial state when the base oil rate was higher. This indicates that since the thickening agent obstructs transmission of heat, fixing failures tended to occur more in the initial state as the amount of thickening agent was increased.

Further, less fixing failures tended to occur in Examples 2-1 to 2-3 compared to Comparative Example 7. This is considered to be caused, according to Comparative Example 7, by the lubricant having viscosity not easily spreading across the inner surface 131 since the inner surface 131 of the fixing film 13 is smooth, and the lubricant was applied nonuniformly. Meanwhile, in Examples 2-1 to 2-3, the inner surface 131 of the fixing film 13 has a minute roughness, such that the lubricant containing the thickening agent spreads through the entire inner surface 131, and the lubricant tends to be applied uniformly, such that the fixing failures in the initial state is considered to be reduced.

Based on the results described above, even in a case where a lubricant containing a thickening agent is used, it has been recognized that a good initial fixing property may be obtained if the base oil rate is 80% or more.

As described above, according to the present embodiment, a minute roughness is formed on the inner surface 131 of the fixing film 13, and a lubricant containing a small amount of thickening agent is used. The minute roughness is formed such that the developed interfacial area ratio Sdr falls within the range of 0.1 or more and 0.5 or less, that is, 0.10 or more and 0.50 or less to the second decimal place. Further, the base oil rate of the lubricant is set to 80% or more. Thereby, a fixing unit capable of realizing a good initial fixing property and a stable slidability for a long period of time, and an image forming apparatus equipped with the same may be provided.

According to further to the present embodiment, properties such as consistency and water resistance of the lubricant may be adjusted by combining the thickening agent. Therefore, the property of the lubricant may be adjusted according to the actual configuration of the fixing unit 1 while realizing a good initial fixing property and a stable slidability.

OTHER EMBODIMENTS

In the respective embodiments described above, the heater 11 that generates heat by itself and that has the contact surface 111 with the fixing film 13 has been described as an example of a heating portion that comes into contact with the inner surface of the fixing film 13 and that heats the fixing film 13. The member coming into contact with the inner surface of the fixing film 13, i.e., contact portion, may be a heat conduction member that is a different member as the heating portion and that conducts heat received from the heating portion, i.e., heat source, to the fixing film 13. The heat source may be a member arranged in contact with the heat conduction member and that conducts heat by thermal conduction to the heat conduction member, or may be a member that is arranged in non-contact with the heat conduction member and that transfers heat to the heat conduction member by heat radiation. For example, the heat conduction member may be a sheet shaped member that is applied between the heater 11 and the fixing film 13. The sheet shaped member may have a high thermal conductivity and a high slidability against the fixing film 13, and for example, it may be a metal thin plate or a resin sheet. That is, the contact portion may be a heat conduction member arranged between the heater 11, i.e., heating portion, and the fixing film 13, i.e., rotary member, and that conducts the heat generated by the heating resistors 11b of the heater 11 to the fixing film 13. Further, the heat conduction member may be a plate shaped member that is heated by radiation heat, for example, from a halogen lamp serving as a heat source.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-012744, filed on Jan. 31, 2024, which is hereby incorporated by reference herein in its entirety.

What is claimed is:

1. A fixing unit comprising:
a rotary member formed in a tubular shape and configured to rotate;

a contact portion arranged in an internal space of the rotary member and configured to be in sliding contact with an inner surface of the rotary member;

a pressing member configured to be in contact with an outer surface of the rotary member and arranged to sandwich the rotary member together with the contact portion; and a heating portion configured to heat the rotary member such that the rotary member heats an image on a recording material being nipped in and conveyed through a nip portion between the rotary member and the pressing member and thus the image is fixed to the recording material, wherein a lubricant is applied between the inner surface of the rotary member and the contact portion, wherein the lubricant contains a base oil at a ratio of 80% or more with respect to a total mass of the lubricant, and wherein a developed interfacial area ratio of the inner surface of the rotary member is 0.10 or more and 0.50 or less.

2. The fixing unit according to claim 1, wherein the lubricant does not contain a thickening agent.

3. The fixing unit according to claim 1, wherein the lubricant contains a thickening agent at a ratio of 20% or less with respect to the total mass of the lubricant.

4. The fixing unit according to claim 1, wherein the developed interfacial area ratio of the inner surface of the rotary member is 0.26 or more and 0.42 or less.

5. The fixing unit according to claim 1, wherein the rotary member includes an inner layer configured to form the inner surface, and wherein the inner layer is a resin film in which a filler is dispersed within a resin material.

6. The fixing unit according to claim 5, wherein the filler is needle shaped.

7. The fixing unit according to claim 6, wherein the filler is a carbon nanotube, a needle-shaped titanium oxide, or a mixture of carbon nanotube and needle-shaped titanium oxide.

8. The fixing unit according to claim 5, wherein the resin film is a polyimide resin composition in which the filler is dispersed within a polyimide resin.

9. The fixing unit according to claim 8, wherein the filler is added at a ratio of 20 vol. % or more and 45 vol. % or less with respect to an overall volume of the polyimide resin composition.

10. The fixing unit according to claim 1, wherein the heating portion includes abase plate, and a heating resistor formed on the base plate and configured to generate heat when an electric current is passed through.

11. The fixing unit according to claim 10, wherein the heating portion includes a protecting layer formed to cover the heating resistor, and wherein the contact portion is a surface of the protecting layer.

12. The fixing unit according to claim 11, further comprising:

a holding member configured to hold the heating portion;

a stay configured to support the holding member; and an urging member configured to urge the stay such that the contact portion and the pressing member are in pressure contact with each other while nipping the rotary member, wherein the rotary member is formed of a film member having flexibility, and configured to rotate by receiving a frictional force from the pressing member that rotates by receiving a driving force.

13. The fixing unit according to claim 10, wherein the contact portion is a heat conduction member arranged between the heating portion and the rotary member, and configured to conduct a heat generated by the heating resistor to the rotary member.

14. An image forming apparatus comprising:

an image forming portion configured to form an image on a recording material; and the fixing unit according to claim 1, wherein the fixing unit is configured to fix an image formed by the image forming portion to the recording material.

\* \* \* \* \*